US010230563B2

(12) United States Patent
Porfiri et al.

(10) Patent No.: US 10,230,563 B2
(45) Date of Patent: Mar. 12, 2019

(54) METHODS AND FIRST NETWORK NODE FOR MANAGING A STREAM CONTROL TRANSMISSION PROTOCOL ASSOCIATION

(71) Applicant: Telefonaktiebolaget LM Ericsson (publ), Stockholm (SE)

(72) Inventors: Claudio Porfiri, Stockholm (SE); Federico Zuccardi Merli, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 4 days.

(21) Appl. No.: 15/522,022

(22) PCT Filed: Dec. 19, 2014

(86) PCT No.: PCT/SE2014/051538
§ 371 (c)(1),
(2) Date: Apr. 26, 2017

(87) PCT Pub. No.: WO2016/099357
PCT Pub. Date: Jun. 23, 2016

(65) Prior Publication Data
US 2017/0331665 A1 Nov. 16, 2017

(51) Int. Cl.
*G06F 15/16* (2006.01)
*H04L 29/06* (2006.01)

(52) U.S. Cl.
CPC ...... *H04L 29/06095* (2013.01); *H04L 65/608* (2013.01); *H04L 69/14* (2013.01); *H04L 69/16* (2013.01); *H04L 69/163* (2013.01)

(58) Field of Classification Search
CPC . H04L 29/06095; H04L 65/608; H04L 69/16; H04L 69/163
See application file for complete search history.

(56) References Cited

U.S. PATENT DOCUMENTS 6,754,715 B1 * 6/2004 Cannon ................ H04L 29/06
709/231
7,180,896 B1 * 2/2007 Okumura ............. H04L 1/1628
370/394

(Continued)

OTHER PUBLICATIONS

Stewart, Randall R., "Stream Control Transmission Protocol," Network Working Group, Request for Comments (RFC): 2960, Category: Standards Track, Oct. 2000, The Internet Society, 121 pages.

(Continued)

*Primary Examiner* — Moustafa M Meky
(74) *Attorney, Agent, or Firm* — Withrow & Terranova, PLLC

(57) ABSTRACT

A method and a first network node for managing a Stream Control Transmission Protocol, "SCTP" is disclosed. The first network node handles a plurality of computational resources for executing procedures of SCTP at least partially simultaneously. The first network node provides a single instance procedure for managing the SCTP association and multi-instance procedures for managing the SCTP association. Furthermore, the first network node provides a control procedure, being the single instance procedure, for managing flow and acknowledgement of SCTP packets at the SCTP association. The first network node provides the following multi-instance procedures an outgoing transmission procedure for managing and transmitting the SCTP packets from the retransmission buffer, an incoming reception procedure for receiving and managing the SCTP packets, and an outgoing reception procedure for managing and transmitting Upper Layer Protocol frames to the upper layer.

6 Claims, 11 Drawing Sheets

(56) References Cited

U.S. PATENT DOCUMENTS

| | | | |
|---|---|---|---|
| 8,700,866 B2* | 4/2014 | Ikeda | G06F 13/4059 |
| | | | 711/149 |
| 9,979,516 B2* | 5/2018 | Onodera | H04W 16/28 |
| 2008/0101357 A1 | 5/2008 | Iovanna et al. | |
| 2009/0257450 A1 | 10/2009 | Sirigiri et al. | |
| 2011/0066822 A1* | 3/2011 | Ikeda | G06F 13/4059 |
| | | | 711/170 |
| 2011/0075679 A1* | 3/2011 | Yui | H04L 1/1825 |
| | | | 370/412 |
| 2011/0261758 A1 | 10/2011 | Hapsari et al. | |

OTHER PUBLICATIONS

Stewart, Randall R., "Stream Control Transmission Protocol," Network Working Group, Request for Comments (RFC): 4960, Category: Standards Track, Sep. 2007, The IETF Trust, pp. 1-152.
Wadhwa, Deepak, "SCTP Fast Path Optimization for 3G/LTE Networks," Radisys White Paper, Sep. 2011, Radisys Corporation, pp. 1-7.
International Search Report and Written Opinion for International Patent Application No. PCT/SE2014/051538, dated Aug. 26, 2015, 12 pages.

* cited by examiner

METHODS AND FIRST NETWORK NODE FOR MANAGING A STREAM CONTROL TRANSMISSION PROTOCOL ASSOCIATION

This application is a 35 U.S.C. § 371 national phase filing of International Application No. PCT/SE2014/051538, filed Dec. 19, 2014, the disclosure of which is incorporated herein by reference in its entirety.

TECHNICAL FIELD

Embodiments herein relate to computer networks, such as a Stream Control Transmission Protocol (SCTP) computer network. In particular, a method and a first network node for managing an SCTP association between the first network node and a second network node are disclosed. A corresponding computer program and a carrier therefor are also disclosed.

BACKGROUND

In computer networks, a protocol known as Stream Control Transport Protocol (SCTP) provides resilience towards network failures by having the capability to select between several Internet Protocol (IP) paths for an association, e.g. a communication link or the like, between two nodes, aka End-Points (EP). This means that SCTP is a layer on top of an IP layer. A further layer on top of the SCTP layer is referred to as a SCTP user, or upper layer, herein. See e.g. Request For Comments (RFC) 4960, Internet Engineering Task Force (IETF).

The association is used by SCTP for transmission of information between the two nodes. A function for selection between several IP paths is often referred to as multi-homing. The Association is a peer-to-peer connection that allows multiple streams, e.g. on several Internet Protocol (IP) paths. The IP paths can be routed different routes through a network. Thus, if one path is congested, SCTP may switch to another path in order to enable continued traffic on the association handled by SCTP. This means that the association can exploit more than a single path in the network in order to achieve robustness and reliability.

With SCTP, data are transferred between the nodes by adopting a chunk paradigm. The chunk paradigm means that an SCTP packet includes one or more chunks. The chunk is the unit of information within an SCTP packet. The chunk may transport data or control information for protocol handling.

SCTP uses Selective Acknowledgement (SACK) on chunk basis, which means that each single data chunk within an SCTP packet is acknowledged and—if needed—retransmitted, independently from other chunks.

The Association has a reception buffer comprising received chunks that are not transferred to the SCTP user yet, and a transmission buffer that keeps all data that has not been successfully transferred to the remote peer.

As is well known, computers and computer systems capable of parallel processing are becoming more and more widespread. In this context, SCTP has been adapted to take advantage of the parallel processing capacity of such computer systems.

In a known implementation of SCTP, it is possible to scale up within an SCTP Endpoint, for instance by dedicating independent resources to each Association. With this know implementation, a SCTP Host that needs to handle a large number of Associations, can exploit additional computational resources for parallel processing of different associations.

As an example, US20080101357 discloses a method and apparatus for IP network interfacing that provides a possibility to have an arbitrary number of computational resources within an SCTP EP by exploiting a computer network hidden behind a Network Address Translation (NAT).

A problem with the known implementation is that multiple computational resources may not improve performance within a single association. A common prejudice among persons skilled in SCTP is that an implementation of SCTP that allows for parallel processing of a single association is impossible due to the sequential nature of RFC2960, superseded by RFC4960 and further corrections which specifies SCTP as a standard.

As a result, capacity of an association between two SCTP EPs is limited by capacity of a single computational resource for each of the two SCTP EPs.

SUMMARY

An object may be to increase capacity of an association between to SCTP EPs.

According to an aspect, the object is achieved by a method, performed by a first network node, for managing an SCTP association between the first network node and a second network node, wherein the first network node handles a plurality of computational resources for executing procedures of SCTP at least partially simultaneously, wherein the SCTP association is provided by a SCTP layer between an upper layer on top of the SCTP layer and a lower layer below the SCTP layer. The first network node provides a single instance procedure for managing the SCTP association and multi-instance procedures for managing the SCTP association, wherein the single instance procedure is executable, as a single instance of the single instance procedure, by only one computational resource at any given time, and wherein each multi-instance procedure of the multi-instance procedures is executable as one or more instances of said each multi-instance procedure, by one or more computational resources at any given time.

Furthermore, the first network node provides a control procedure for managing flow and acknowledgement of SCTP packets at the SCTP association, wherein the control procedure manages a retransmission buffer including at least one SCTP container, generated based on Upper Layer Protocol (ULP) frames of the upper layer and/or received SCTP packets, wherein the control procedure manages a reception buffer including the received SCTP packets, and wherein the control procedure is the single instance procedure. When sending SCTP packets to the lower layer, the first network node provides an outgoing transmission procedure for managing and transmitting the SCTP packets from the retransmission buffer, wherein the outgoing transmission procedure is one of the multi-instance procedures.

Moreover, when receiving SCTP packets from the lower layer, the first network node provides an incoming reception procedure for receiving and managing the SCTP packets, wherein the incoming reception procedure puts SCTP containers, generated from the received SCTP packets, in a reception buffer, wherein the incoming reception procedure is one of the multi-instance procedures. When emptying the reception buffer, the first network node provides an outgoing reception procedure for managing and transmitting ULP frames to the upper layer, wherein the outgoing reception procedure is one of the multi-instance procedures.

According to another aspect, the object is achieved by a first network node configured to manage an SCTP association between the first network node and a second network node, wherein the first network node is configured to handle a plurality of computational resources for executing procedures of SCTP at least partially simultaneously, wherein the SCTP association is provided by a SCTP layer between an upper layer on top of the SCTP layer and a lower layer below the SCTP layer. The first network node configured to provide a single instance procedure for managing the SCTP association and multi-instance procedures for managing the SCTP association, wherein the single instance procedure is executable, as a single instance of the single instance procedure, by only one computational resource at any given time, and wherein each multi-instance procedure of the multi-instance procedures is executable as one or more instances of said each multi-instance procedure, by one or more computational resources at any given time. The first network node is also configured to provide a control procedure for managing flow and acknowledgement of SCTP packets at the SCTP association, wherein the control procedure manages a retransmission buffer including at least one SCTP container, generated based on ULP frames of the upper layer and/or received SCTP packets, wherein the control procedure manages a reception buffer including the received SCTP packets, and wherein the control procedure is the single instance procedure.

Furthermore, the first network node is configured to provide an outgoing transmission procedure for managing and transmitting the SCTP packets from the retransmission buffer, when sending SCTP packets to the lower layer. The outgoing transmission procedure is one of the multi-instance procedures.

Moreover, the first network node is configured to provide an incoming reception procedure for receiving and managing the SCTP packets, when receiving SCTP packets from the lower layer. The incoming reception procedure puts SCTP containers, generated from the received SCTP packets, in a reception buffer, wherein the incoming reception procedure is one of the multi-instance procedures.

Additionally, the first network node is configured to provide an outgoing reception procedure for managing and transmitting ULP frames to the upper layer, when emptying the reception buffer. The outgoing reception procedure is one of the multi-instance procedures.

According to further aspects, the object is achieved by a computer program and a carrier for the computer program corresponding to the aspects above.

In this manner, capacity of an SCTP association may be increased beyond the limitation of a single computational resource, for example the multi-instance procedures contribute to increased parallel processing capability of the association.

According to the computer program, e.g. realized as the method and/or first network node above, an advantageous implementation of the SCTP protocol is achieved. This means that the method and/or the computer program provide an SCTP computing machine, where machine refers to a virtual machine providing the method herein. The SCTP computing machine is based on a distributed design where capacity load is shared among different computational resources, while still from an external perspective, e.g. that of the SCTP user, the SCTP Association is a monolithic object.

An advantage in view of existing SCTP implementation is that the embodiments herein exploit parallel processing capabilities of e.g. multicore architectures provided with modern Computer Processing Units (CPUs). Hence, the embodiments here enable capacity for processing a single association to go beyond computing capacity of a single CPU core of e.g. the multicore architecture. Of courses, the embodiments herein are fully RFC4960 compliant.

A further advantage is that complexity of a network in which the embodiments are implemented may be reduced. A reason for this is that It is typically more efficient to provide a certain capacity, e.g. bitrate, bandwidth or the like, by means of e.g. two associations, which each provide e.g. half of the certain capacity, than by means of e.g. four associations, which each provide e.g. one quarter of the certain capacity. A reason for this is that a number of endpoints increases proportionally to a number of associations. As a consequence, a network, in which the embodiments herein may be implemented, may be less complex, e.g. in terms of number of endpoints. As a further consequence, cost for administrating and deploying the network may be reduced as well. For examples, less hardware may be required to provide the same capacity.

Moreover, in some examples, thanks to use of multiple computational resources for the same association cheaper CPUs, with many computational resources, such as cores, operating at lower clock frequency may be used. This may even further reduce the cost of hardware for the network.

Additionally, the embodiments herein enable even, or at least less uneven, distribution of a computational load for handling a single association over available computational resources. Thanks to that the embodiments herein enable distribution of the computational load, an improved scalability is achieved. This means that e.g. addition of further computational resources, e.g. in terms of multiple cores, network nodes etc., to the network may increase capacity also for a single association. With existing solutions, whenever computational load, e.g. due to SCTP traffic, becomes too high for a single CPU core, the existing solutions propose to either redesign the SCTP network in order to exploit more SCTP Endpoints, or to replace the single CPU core with a more powerful one. Instead, as mentioned, the embodiments herein enable scaling of the SCTP capacity without redesign and/or hardware upgrade(s).

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
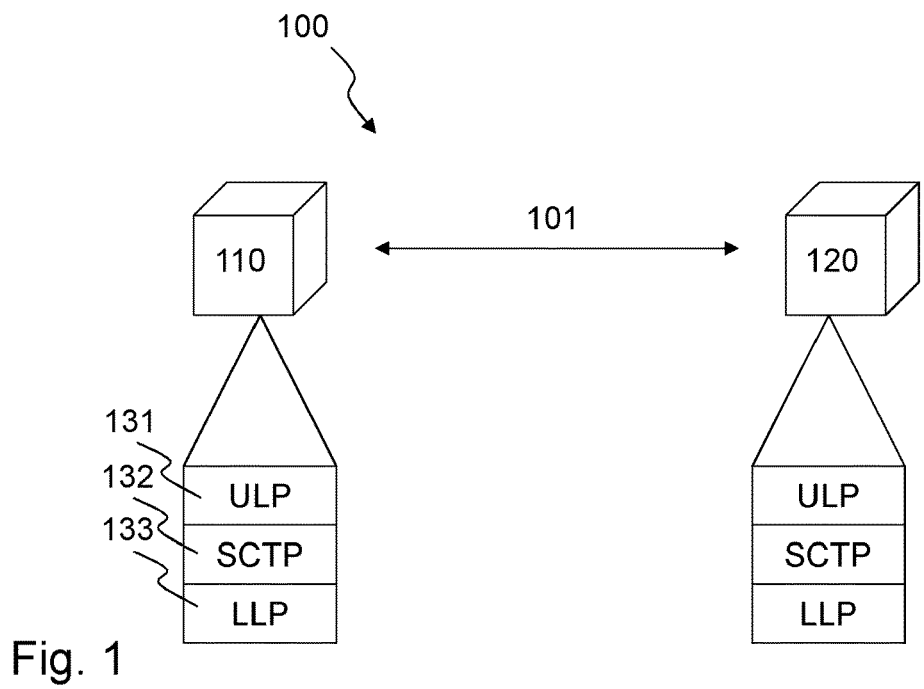
FIG. 1 is a schematic overview illustrating an exemplifying network, in which embodiments herein may be implemented.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

FIG. 1 depicts an exemplifying network 100 in which embodiments herein may be implemented. In this example, the network 100 is a Long Term Evolution (LTE) network. In other examples, the network 100 may be a fixed network or any cellular or wireless communication system, such as a Global System for Mobile Communications (GSM), Universal Mobile Telecommunication System (UMTS) and Worldwide Interoperability for Microwave Access (Wi-MAX) allowing a layer of D2D communications or the like. To summarize, the network 100 may be any network using a set of telephony signaling protocols, such as a Signalling System No. 7 (SS7) is transported over IP, see layers below.

The network 100 comprises a first network node 110 and a second network node 120.

The first network node 110 may be a first SCTP endpoint and the second network node 120 may be a second SCTP endpoint.

The first and second network nodes 110, 120 may communicate 101 with each other over a SCTP association, e.g. a connection, a communication link, a link or the like.

The first network node 110 operates a number of protocols in different layers. As is seen from FIG. 1, the first network node 110 operates an upper layer protocol 131, aka an SCTP user or user layer. The first network node 110 further operates a layer including SCTP 132, aka an SCTP layer. Moreover, the first network node 110 operates a lower layer protocol 133, such as an IP layer or the like.

Figure 3:
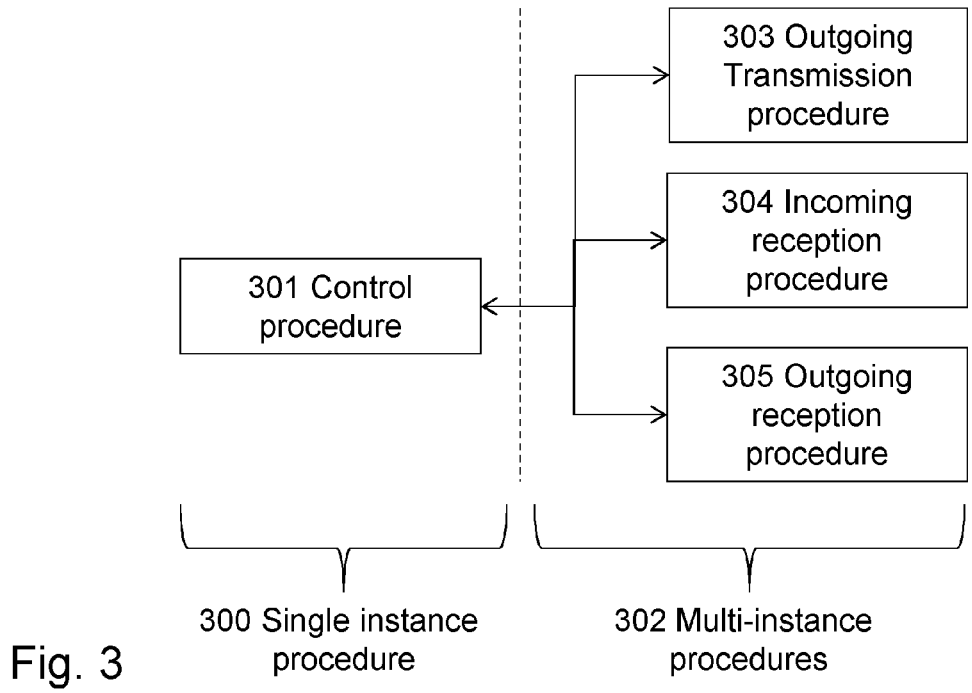
FIG. 3 is another schematic overview of single instance and multi-instance procedures according to embodiments herein.

The embodiments herein are based on splitting the handling of the SCTP association in atomic tasks, or procedures. The atomic tasks are then driven according to the dependencies towards time and transactions. Moreover, an architecture that can be spread over multiple independent computational resources is built as shown herein. An exemplifying architecture is illustrated in FIG. 3, but first the method according to embodiments will be described.

Figure 2A:
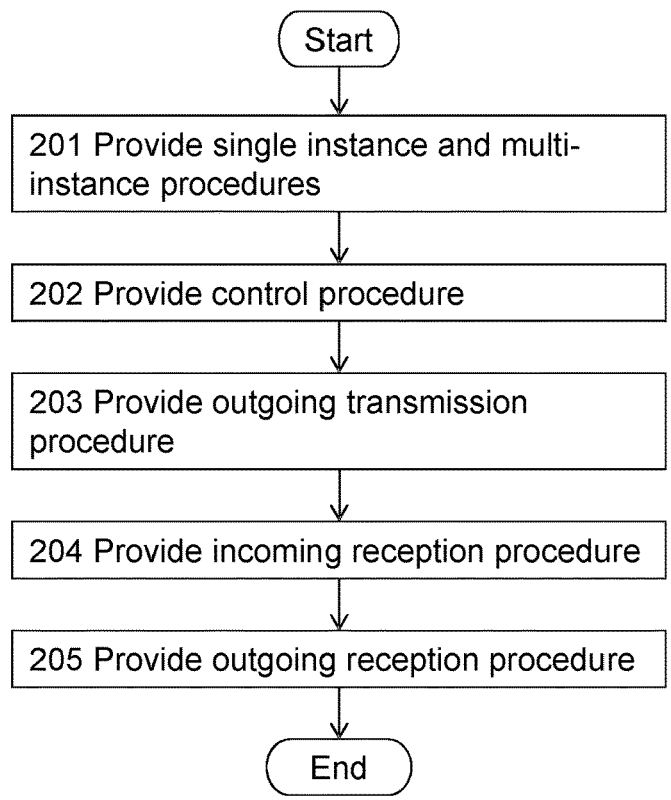
FIGS. 2a and 2b are flowcharts illustrating embodiments of the method in the first network node.

FIG. 2a illustrates an exemplifying method according to embodiments herein when performed in connection with the network 100 of FIG. 1.

The first network node 110 performs a method for managing the SCTP association between the first network node 110 and the second network node 120.

The first network node 110 handles a plurality of computational resources for executing procedures of SCTP at least partially simultaneously. The SCTP association is provided by the SCTP layer 132 between the upper layer 131 on top of the SCTP layer 132 and the lower layer 133 below the SCTP layer 132.

One or more of the following actions may be performed in any suitable order.

Action 201

In order to the first network node 110 to be able to dynamically adapt number of instances to a computation load, the first network node 110 provides a single instance procedure for managing the SCTP association and multi-instance procedures for managing the SCTP association. The single instance procedure is executable, as a single instance of the single instance procedure, by only one computational resource at any given time. Each multi-instance procedure of the multi-instance procedures is executable as one or more instances of said each multi-instance procedure, by one or more computational resources at any given time. Hence, since the multi-instance procedure is capable of being multiplied to exploit number of computational resources, handling of the SCTP association in any number of multiple computational resources, parallelism is improved.

Action 202

In order to handle those procedures that may be required to be performed in sequence, the first network node 110 provides a control procedure 301 for managing flow and acknowledgement of SCTP packets at the SCTP association. The control procedure 301 manages a retransmission buffer including at least one SCTP container, generated based on ULP frames of the upper layer 131 and/or received SCTP packets. The control procedure 301 manages a reception buffer including the received SCTP packets. The control procedure 301 is the single instance procedure.

As described in more detail with reference to FIG. 2b and FIG. 5 also some of the actions performed by the control procedure may be broken down into further single instance procedures, which may be executable in multiple computational resources at least to some extent, e.g. as governed by triggers or trigger events according to the description of FIG. 5.

Action 203

This action relates to when the first network node 110 sends, while using the SCTP association 101, information to the second network node 120. The information may be any kind of information typically formatted as an ULP packet. The ULP packet denotes any interface or protocol, such as e.g. S1 known from LTE, SS7 Message Transfer Part 2 and 3 (MTP2 and 3) adaptation layers in Signalling Transport (SIGTRAN), used between the first and second network node 110, 120.

As an example, the upper layer 131 of the first network node 110 sends ULP packets, or ULP frames, which are to be transmitted over the SCTP association 101 to the second network node 120. These UPL packets are processed by the control procedure and put in the retransmission buffer, which includes SCTP packets.

Thus, when sending the SCTP packets to the lower layer 133, the first network node 110 provides an outgoing transmission procedure 303 for managing and transmitting the SCTP packets from the retransmission buffer. The outgoing transmission procedure 303 is one of the multi-instance procedures. As such, the outgoing transmission procedure 303 may thus be executed as multiple instances exploiting e.g. one computational resource for each instance thereof.

Action 204

This action relates to when the first network node 110 receives, while using the SCTP association 101, information from the second network node 120. As mentioned, the information may be any kind of information typically formatted as an ULP packet.

As an example, the lower layer 133 of the first network node 110 receives LLP packets, such as IP packets, which are to be provided to the SCTP user, i.e. the upper layer 131, in the form of one or more ULP packets.

Thus, when receiving SCTP packets, i.e. IP packets that have been recognized as SCTP packets by means of a protocol identifier, to be handled and formed into SCTP packets, from the lower layer 133, the first network node 110 provides an incoming reception procedure 304 for receiving and managing the SCTP packets. The incoming reception procedure 304 puts chunks, extracted from the received SCTP packets, in a reception buffer. The incoming reception procedure 304 is one of the multi-instance procedures. As such, the incoming reception procedure 304 may thus be executed as multiple instances exploiting e.g. one computational resource for each instance thereof.

Action 205

Now continuing with when the first network node 110 receives information from the second network node 120.

As seen in action 204, chunks may have been put in the reception buffer. These chunks are now formed into ULP frames, or ULP packets.

Thus, when emptying the reception buffer, the first network node 110 provides an outgoing reception procedure 305 for managing and transmitting ULP frames to the upper layer, e.g. while forming the ULP frames based on the chunks in the reception buffer. The outgoing reception procedure 305 is one of the multi-instance procedures. As such, the outgoing reception procedure 305 may thus be executed as multiple instances exploiting e.g. one computational resource for each instance thereof.

Figure 2B:
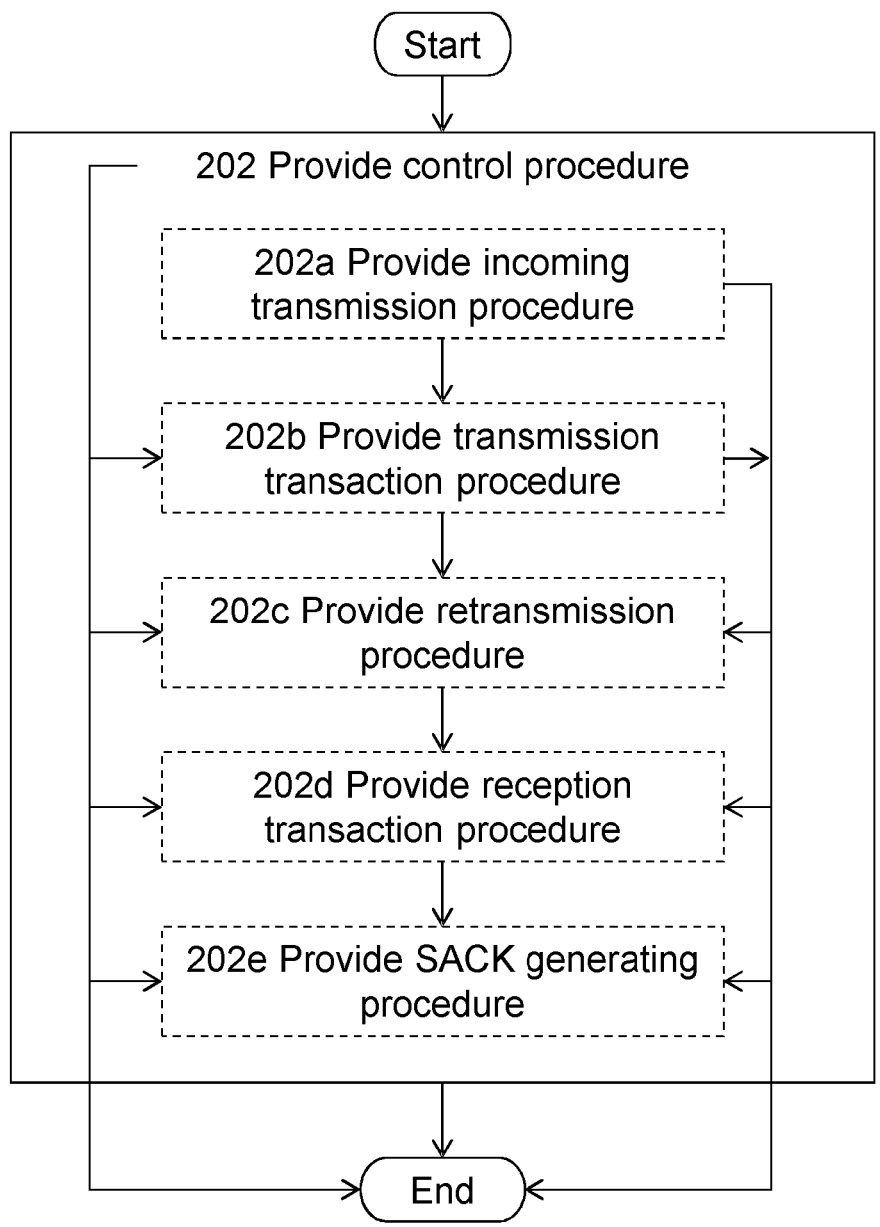

FIG. 2b illustrates action 202 in more detail. The control procedure 301 may be divided, or split, into a number of single instance procedures, i.e. a set of single instance procedures. The set of single instance procedures includes the single instance procedure comprising the control procedure 301. Some single instance procedures, mentioned here for the first time, are shown in FIG. 5, which is a block diagram relating to the embodiment of FIG. 2b.

Accordingly, action 202 may further include one or more of the following actions, which may be performed in any suitable order.

Action 202a

The first network node 110 may provide an incoming transmission procedure 501 for managing the retransmission buffer, e.g. creating and filling SCTP containers 401 and feeding them to the transmission transaction procedure 502 provided in subsequent action 202b. The incoming transmission procedure 501 may be one of the single instance procedures of the set of single instance procedure.

The incoming transmission procedure 501 may be executable in one of the computational resources at least partly simultaneously with at least one of the multi-instance procedures and the other single instance procedures.

Action 202b

The first network node 110 may provide a transmission (Tx) transaction procedure 502 for delivering SCTP packets, e.g. via the retransmission buffer, towards the outgoing transmission procedure. The transmission transaction procedure 502 may store the SCTP packets in the retransmission buffer. The transmission transaction procedure 502 may be one of the single instance procedures of the set of single instance procedure.

The transmission transaction procedure 502 may be executable in one of the computational resources at least partly simultaneously with at least one of the multi-instance procedures and the other single instance procedures.

Action 202c

The first network node 110 may provide a retransmission procedure 503 for handling unacknowledged chunks of the transmitted SCTP packets. The retransmission procedure 503 may be one of the single instance procedures of the set of single instance procedure.

The retransmission procedure 503 may be executable in one of the computational resources at least partly simultaneously with at least one of the multi-instance procedures and the other single instance procedures.

Action 202d

The first network node 110 may provide a reception transaction procedure 507 for checking received SCTP packets. The reception transaction procedure 507 may be one of the single instance procedures of the set of single instance procedure.

The reception transaction procedure 507 may be executable in one of the computational resources at least partly simultaneously with at least one of the multi-instance procedures and the other single instance procedures.

Action 202e

The first network node 110 may provide a SACK generating procedure 508 for generating SACKs towards the second network node 120, wherein the SACK generating procedure 508 may be one of the single instance procedures of the set of single instance procedure.

The SACK generating procedure 508 may be executable in one of the computational resources at least partly simultaneously with at least one of the multi-instance procedures and the other single instance procedures.

FIG. 3 is an overview of an architecture which provides the procedures described above according to the method of FIG. 2a.

FIG. 3 shows a single instance procedure 300 in the form of the control procedure 301. Moreover, the Figure shows multi-instance procedures 302 in the form of the outgoing transmission procedure 303, the incoming reception procedure 304 and the outgoing reception procedure 305.

With an implementation of SCTP according to FIG. 3, the control procedure 301 will be a bottleneck, which determines the performance, e.g. through put, of the SCTP association. A reason to this is that the control procedure 301 cannot take advantage of any available computational resources e.g. in another processing core than the one executing the control procedure 301.

Figure 4:
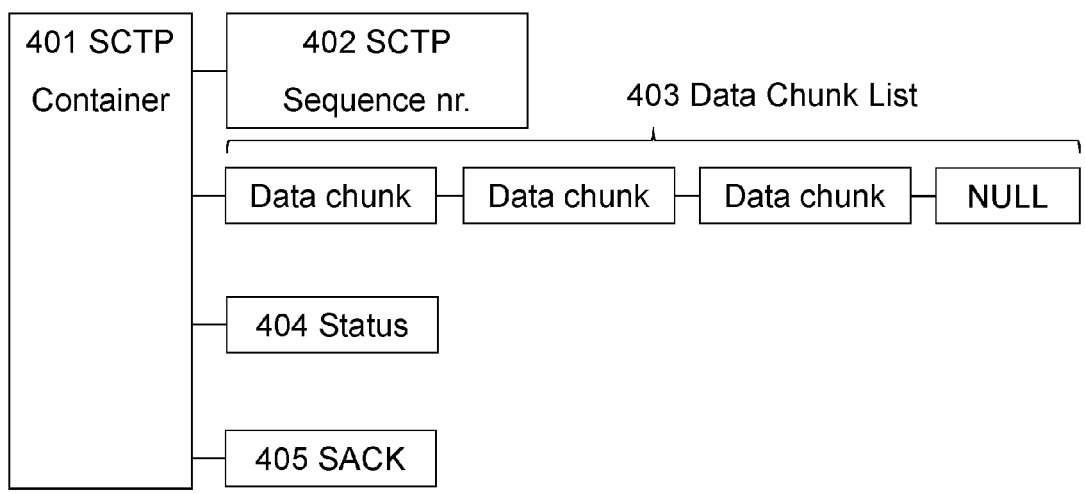
FIG. 4 is a block diagram illustrating an exemplifying SCTP container according to the embodiments herein, FIG. 5 another overview illustrating single instance and multi-instance procedures according to embodiments herein.

Before proceeding with a more detailed example of the embodiment illustrated in FIG. 2b, the SCTP container is described with reference to FIG. 4. The SCTP Container 401 is a data structure able to hold parts that contribute to a complete SCTP packet.

The SCTP Container 401 comprises:
a SCTP sequence number 402,
an optional Data Chunk List 403, optional applies to the case when the list is empty,
optionally, a Status 404 that may take the values: NEW, READY,
a SACK 405.

One or more SCTP Containers may be linked in a list

According to the embodiments herein, the SCTP Containers 401 may be included in one or more of the following:
an Outgoing Packet List, aka a reception buffer,
a Local SACK List, and
a Remote SACK List.

The SCTP Containers 401 may also be used by a Resend Packet List, or the retransmission buffer.

Figure 5:
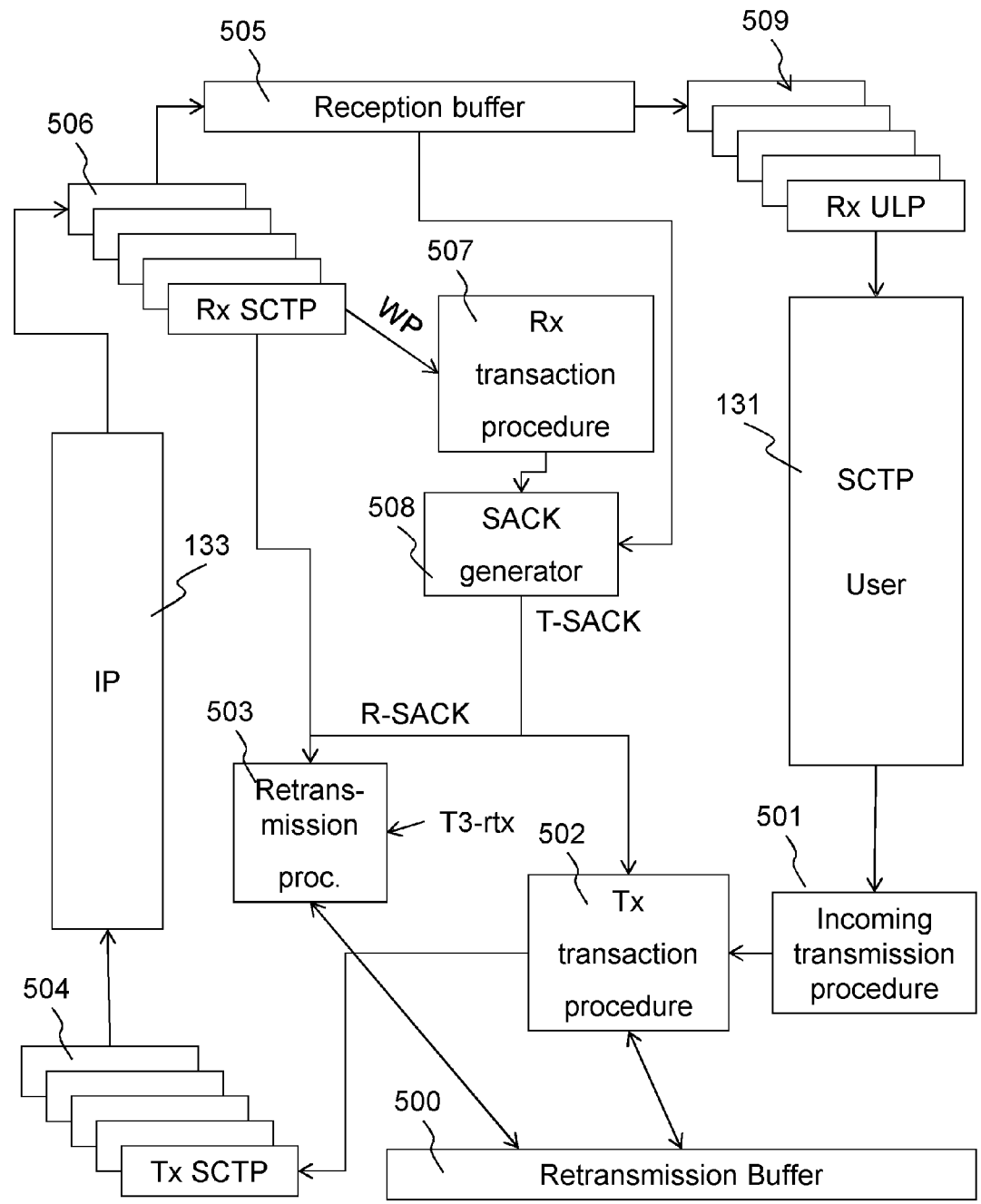

FIG. 5 shows a further overview of an exemplifying embodiment. The embodiments herein provide an SCTP implementation, e.g. as a method, a first network node, a computer program and a carrier therefor, which uses a flow-driven approach.

Rather than replicating identical computing units, the embodiments herein implements SCTP RFC4960 compliant protocol by means of specialized computing units.

A data driven paradigm is realized by instantiating a certain amount of identical computing units in order to accelerate heavier tasks, such as those handled by the multi-instance procedures, at the same time atomic computational units are used for handing transactions, such as the control procedure being a single instance procedure.

The embodiments herein provide improve performance, especially when there are enough bandwidth resources both towards the ULP layer 131 and the LLP layer 133.

The following description includes description of the data path, i.e. a transmission data path and a reception data path.

A main purpose of the transmission data path is to take payload from the SCTP-user and transfer the payload to the second network node 120. As such, its data flow is organized around three main data structures (and their component parts):
a data chunk
an SCTP Container
a retransmission Buffer The data chunk comprise a link to Upper Layer Data (ULD) and a Transmission Sequence Number (TSN). The data chunks may be linked in a Data Chunk List, which may be reached via an SCTP container.

ULD is the raw payload data being sent from the SCTP user. Such data must be transferred to the remote SCTP user.

The TSN is used to guarantee integrity and ordering of the transmission over the SCTP association 101.

Still referring to FIG. 5, a retransmission buffer 500 may comprise data that will be consumed by a retransmission procedure 503. The retransmission buffer 500 comprises, as one of its basic elements, one or more SCTP containers, with the addition of housekeeping data to support retransmission timers and counters.

Data in the retransmission buffer 500 is kept until it is removed, when a corresponding acknowledge is received, or retransmitted.

A first procedure in the transmission data path is the incoming transmission procedure 501, aka an ULP handler.

Figure 6:
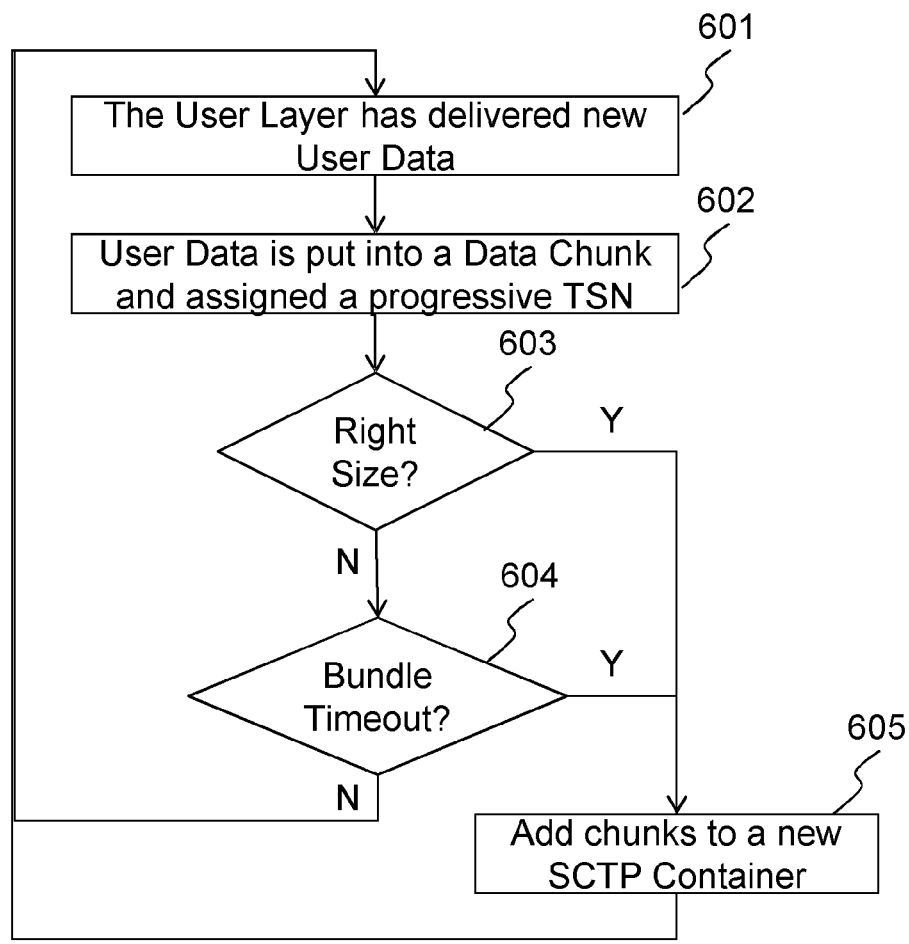
FIG. 6 is a flowchart illustrating actions performed by an exemplifying incoming transmission procedure.

In FIG. 6, a flow chart illustrating the actions performed by the incoming transmission procedure 501 is shown. The incoming transmission procedure may be included in the control procedure 301. A purpose of the incoming transmission procedure 501 is to handle transactions and provide functionality for interfacing with the SCTP user and the retransmission buffer 500.

The incoming transmission procedure 501 handles a Maximum Transmission Unit (MTU) size and a size of a GSACK, which is a SACK message containing neither gaps nor duplicated TSN indications.

At reception of ULDs, such as ULP packets/frames, user data or the like, the incoming transmission procedure 501 takes care of bundling as it implements formatting of SCTP packets as they will be delivered to the transmission transaction procedure 502.

The incoming transmission procedure 501 is triggered by the reception of an ULD from the SCTP User, or by the expiration of bundling time, i.e. an instance of the incoming transmission procedure 501 is completed, or finished, with its task.

Action 601

When bundling, the incoming transmission procedure 501 may react at the reception of a ULD by starting the bundling timer, and start collecting data, from the SCTP user, until the expiration of the timer itself, see also action 603, 604 and 605. Otherwise, the data collection will be started at reception of a ULD.

Action 602

The data collection picks ULDs in order from the Upper Layer Interface, e.g. the SCTP user, then on each ULD it creates a new Data Chunk, it links the ULD to the Data Chunk, it sets the TSN according to the progressive TSN number generation of rfc4960 and queues the ULD in a list.

Action 603, 604 and 605

When one of the three event events happens:
the sum of sizes of the PDUs in the list+the size of a GSACK is the maximum possible fitting in a SCTP packet of size MTU
there are no further ULD to process, and
bundling timer expires, if bundling is enabled,
the incoming transmission procedure 501 stops appending new Data Chunks to the current list, it creates a new SCTP Container and connects the current list to the SCTP Container, the SCTP Container Status is set to READY, and then it queues the SCTP Container into the reception buffer 505 and triggers the transmission transaction procedure 502.

Figure 7:
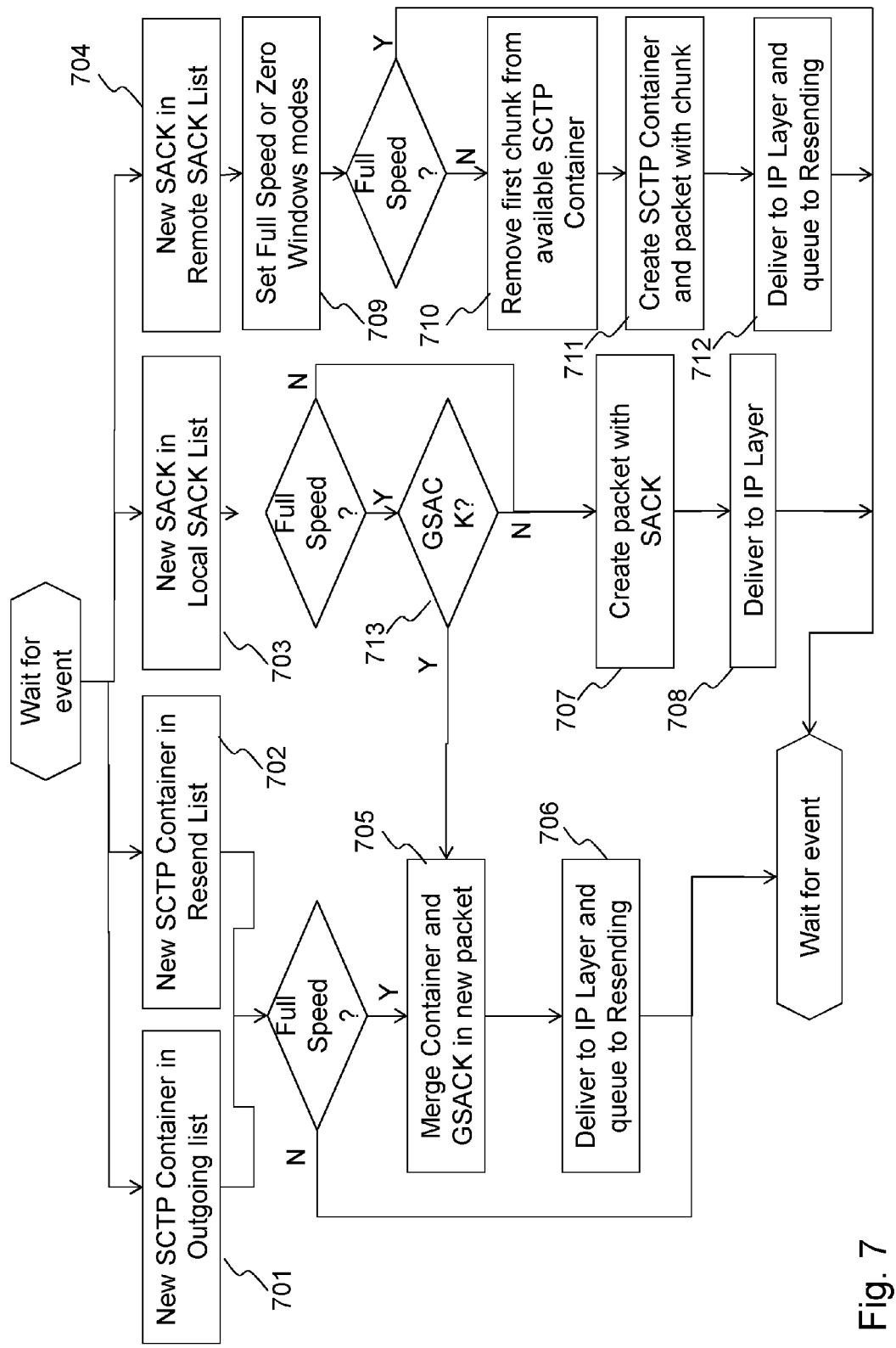
FIG. 7 is a flowchart illustrating actions performed by an exemplifying transmission transaction procedure.

In FIG. 7, a flow chart illustrating the actions performed by the transmission transaction procedure 502 is shown. The transmission transaction procedure may be included in the control procedure 301.

The transmission transaction procedure 502, aka SCTP Tx transaction handler, is a single instance task whose responsibility is to accomplish sending of SCTP packets i.e. delivering SCTP packets to the outgoing transmission procedure 504.

The transmission transaction procedure 502 assigns SCTP packet numbers, and takes decision on how SCTP packets are actually shaped.

Values of interest for SCTP Sender are:
the MTU size,
cwnd variable defined in RFC4960, and
SACK.a_rwnd variable defined in RFC4960.

The transmission transaction procedure 502 is triggered by:
New SCTP Container with status READY in the reception buffer 505, 701,
New SCTP Container in the retransmission buffer 500, 702,
New SACK packet in Local Sack List 703,
New SACK packet in Remote Sack List. The transmission transaction 704 procedure 502 takes the responsibility for updating the rfc4960 variable cwnd according to rfc4960 rules.

The methods herein may be performed in either Full Speed mode or in Zero Window Probe mode.

When in Full Speed mode, at the time when the transmission transaction procedure 502 is triggered, it starts removing one SCTP Container at a time, if any, either from the retransmission buffer 500 or from the reception buffer 505, then it looks for the existence of a SACK in Local Sack List. If a SACK exists in the Local Sack List, it can be a GSACK, in that case suck GSACK is appended to the SCTP packet belonging to the current SCTP Container 705, a reference to the Container is delivered to the outgoing transmission procedure 504, at the same time SCTP Container is queued towards the retransmission procedure 503 706. If the SACK is not a GSACK, then a new SCTP Container is created without any chunk 707, and then delivered to the outgoing transmission procedure 504 708. If a SACK exists in the Remote Sack list, the SACK.a_rwnd is considered for Congestion Control algorithm according to RFC4960, and for deciding whether SCTP Sender will stay in Full Speed Mode 709. If SACK.a_rwnd is less than MTU size, SCTP Sender will switch to Zero Windows Probe mode. The above described behavior is iterated according to the RFC4960 Congestion Control conditions, and cwnd is updated according.

When in Zero Window Probe mode, the transmission transaction procedure 502 is only triggered by a SACK in Local Sack List or a SACK in Remote Sack List. If a SACK exists in Local Sack List, then a new SCTP Container is created without any chunk 707, and then delivered to the outgoing transmission procedure 504. If a SACK exists in the Remote Sack list, the SACK.a_rwnd is considered for Congestion Control algorithm according to RFC4960, and for deciding whether the transmission transaction procedure 502 will stay in Zero Windows Probe mode. If SACK.a_rwnd is bigger than MTU size, the transmission transaction procedure 502 will switch to Full Speed mode 709. If the transmission transaction procedure 502 must stay in Zero Window Probe mode, then an SCTP Container is considered. If an SCTP Container is not available within the transmission transaction procedure 502, one is taken from the reception buffer 505 or from the retransmission buffer 500. The first chunk in the SCTP Container is removed 710 from the SCTP Packet in the Container. A new SCTP Container is created 711 with an SCTP Packet containing only this chunk. The SCTP Packet is delivered to the outgoing transmission procedure 504, and the SCTP Container is queued towards the retransmission procedure 503 712. If the removed Chunk was the last from the current SCTP Container, then the whole SCTP Container is destroyed and the related memory is made available. If the transmission transaction procedure 502 must switch to Full Speed mode, then if a SCTP Container exists within SCTP Sender, then if a SACK exists in the Local Sack List, it's checked 713 if it's a GSACK, in that case suck GSACK is appended 705 to the SCTP packet belonging to the SCTP Container, a reference to the Container is delivered 706 to the outgoing transmission procedure 504 and the related SCTP Container is queued towards the retransmission procedure 503. If the SACK is not a GSACK, then a new SCTP Packet is created and fully completed 707, then delivered 708 to the outgoing transmission procedure 504.

Figure 8:
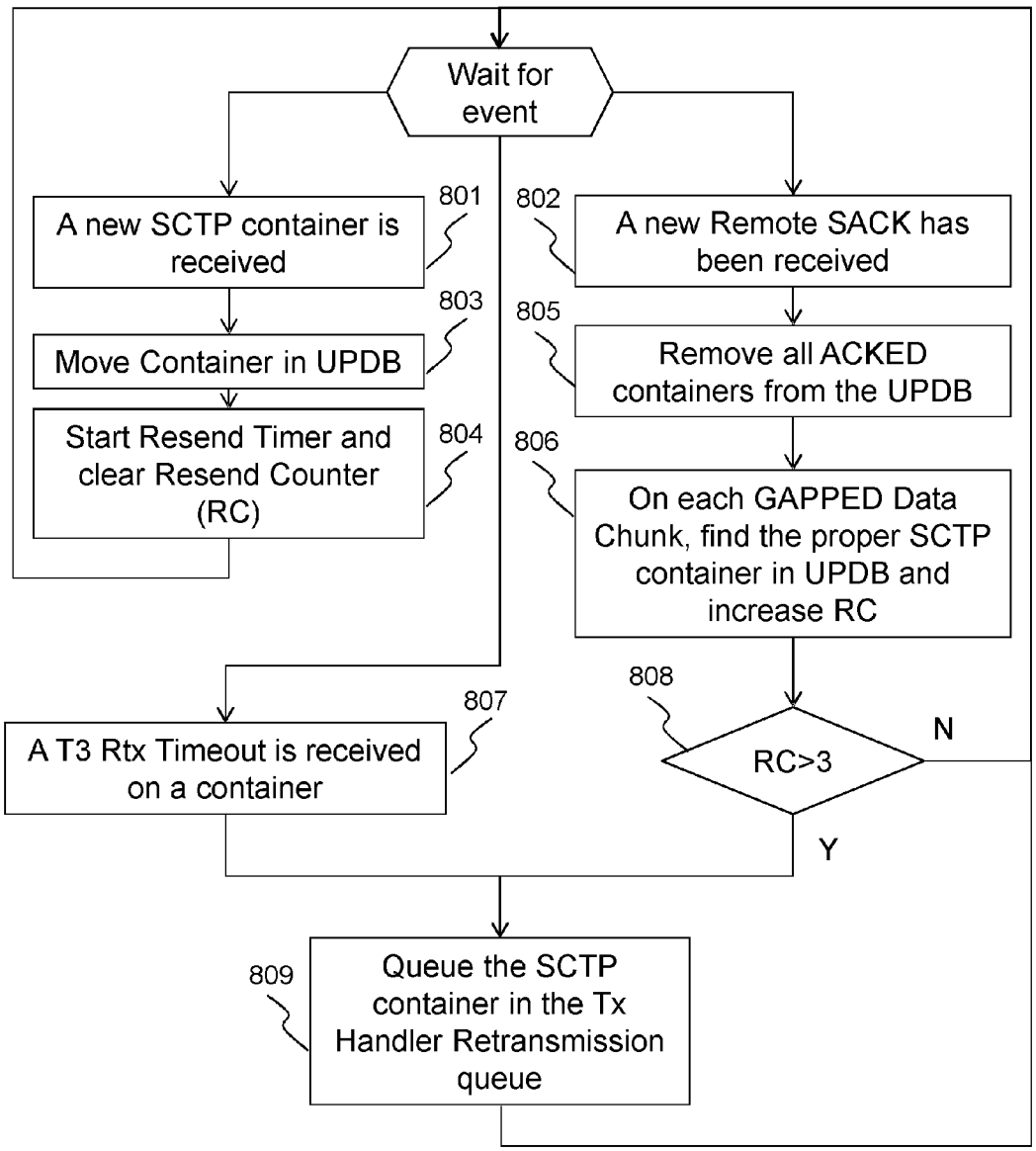
FIG. 8 is a flowchart illustrating actions performed by an exemplifying retransmission procedure.

Turning to FIG. 8, a flow chart illustrating actions performed by the retransmission procedure 503 is shown.

The retransmission procedure 503 is a single instance task whose responsibility is to take care of unacknowledged chunks and queue SCTP Containers for resending. This may mean that the retransmission procedure 503 may be included in the control procedure 301.

The retransmission procedure 503 takes decision on chunks and keeps the status for retransmission.

The retransmission procedure 503 is triggered by:
 new SCTP Container queued from the transmission transaction procedure 502 801,
 new SACK packet in Remote Sack List 802,
 resend Timeout for a certain SCTP Container 807, or
 resend Counter for a certain SCTP Container 808.

Even though RFC4960 describes procedures at Chunk level, the retransmission procedure 503 works on SCTP packet level, as it assumes that complete SCTP packets are lost, not single chunks.

When a new SCTP Container is received 801 from the SCTP Sender, the retransmission procedure 503 moves 803 that Container in an internal Unacknowledged Packets Data-Base (UPDB), starts a Resend Timer according to RFC4960, then it clears the Resend Counter for that SCTP Container 804.

When a new SACK packet is detected 802 in the Remote SACK List, it's analyzed for Cumulative Acknowledge and for Gap Acknowledge.

Based on Cumulative Acknowledge, all SCTP Container having Chunks with TSN less than the Cumulative Ack are removed 805 from the UPDB.

Based on Gap Acknowledge, all gaps within the SACK are grouped according to TSN belonging to SCTP Container within the UPDB. If at least one Chunk belonging to a certain SCTP Container is suspected as lost in the Gap, then the SCTP Resend Counter is increased, thus there will be only one increase in the SCTP Resend Counter regardless of the number of missing chunks within a single SACK 806.

When 807 a Resend Timeout happens for an SCTP Container, it's removed from the UPDB, if a SACK was appended by the SCTP Sender, it's removed and then 809 the SCTP Chunk is queued in the retransmission buffer 500 towards SCTP Sender.

When 808 SCTP Resend Counter exceeds 3, as specified by rfc4960, it's removed from the UPDB, if a SACK was appended by the SCTP Sender, it's removed and then 809 the SCTP Chunk is queued in the retransmission buffer 500 towards the SCTP sender, i.e. when the SCTP user sends information to the second network node 120.

The outgoing transmission procedure 504, shown as 301 in FIG. 3, is a multi-instance procedure, whose responsibility is to create an SCTP packet and deliver it towards IP layer according to the sequence. The outgoing transmission procedure 504, aka Tx SCTP in FIG. 5, is built over a pool of outgoing transmission procedure 504 instances.

An instance of the pool is triggered by the transmission transaction procedure 502 that sends a reference to a SCTP Container for delivering.

One of the outgoing transmission procedure instances will take care of the SCTP Container, it will create an SCTP Packet by using all the information from the Container itself, including calculation of Cyclic Redundancy Check (CRC).

Once the SCTP Packet is built, the outgoing transmission procedure instance waits until all previous SCTP packets have been delivered to IP, and then it delivers its own SCTP packet to IP.

A main purpose of the reception data path is to take IP packets and provide ULP packets to the SCTP user of the first network node 110.

The data flow in the reception data path is built around three data structures, and the related data transformation:
 SCTP Container, see description above,
 reception buffer, and
 Work Instruction.

Three lists of SCTP Containers are used on the reception data path according to the embodiments herein:
 reception buffer 505,
 Local SACK List (not shown), and
 Remote SACK List (not shown).

Figure 9A:
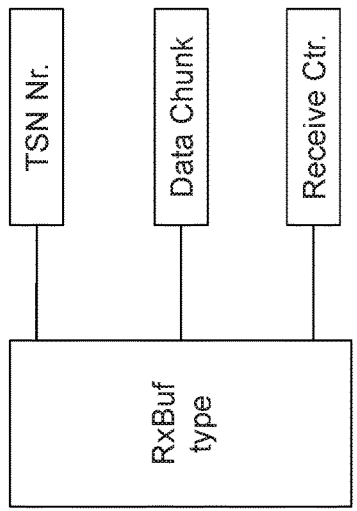
FIGS. 9a and 9b are block diagrams illustrating structure of an exemplifying reception buffer object.

FIG. 9a is a block diagram illustrating a RxBuf type. The reception buffer 505, aka Rx Buffer, is an array aggregate of RxBuf objects.

As shown in FIG. 9a, each RxBuf object is used to represent a data chunk. As such it contains the ULD, Upper Level Data, payload to be delivered to the SCTP user, some status flags, such as Receive Ctr. flags, and is indexed inside the RxBuffer by its TSN Nr.

As the single RxBuffer data structure collects the RxBuf element and indexes them by TSN, the reception buffer 505 is chunk rather than byte oriented, with the advantage of a simpler and more efficient handling at code level. Of course, a_rwnd values, known from RFC4960, reported towards the second network node 120 will still be calculated in bytes, as the standard mandates.

Figure 9B:
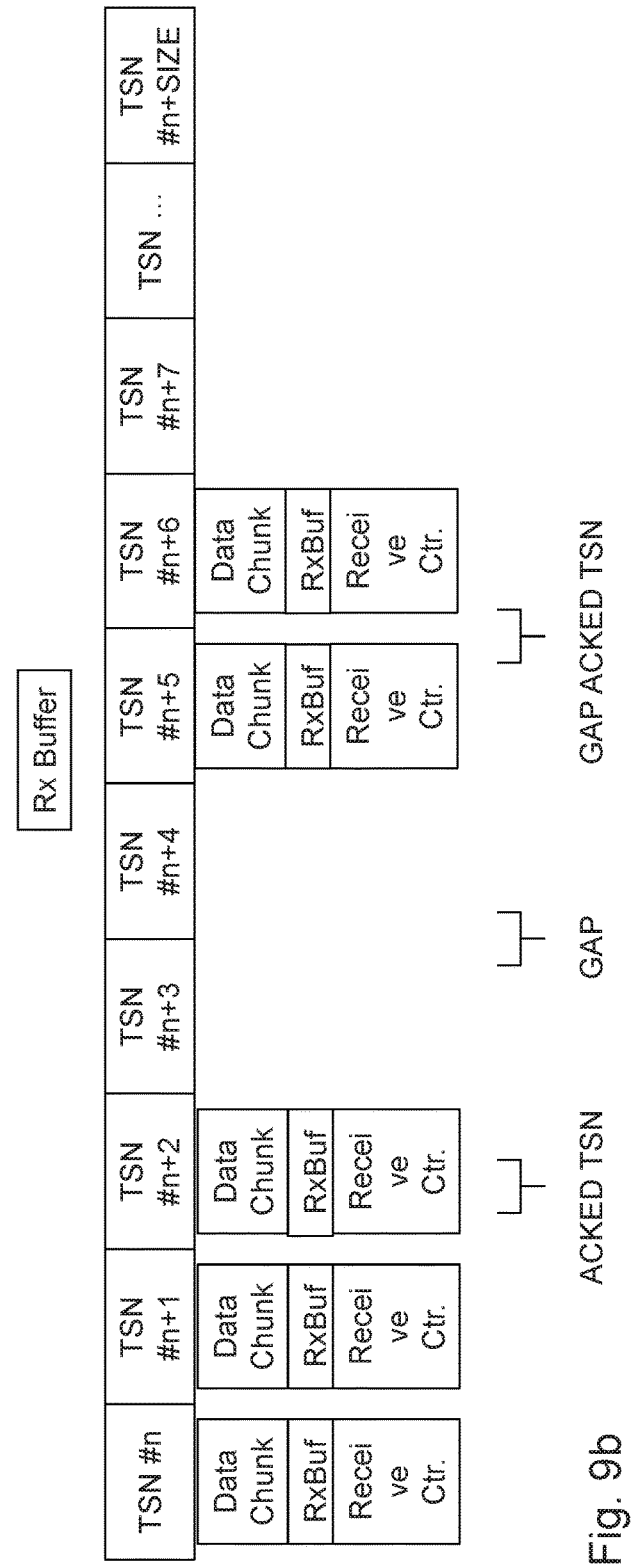

FIG. 9b illustrates an exemplifying list of Rx Buf objects.

Work Instruction

Work Instruction, or Work Package (WP), is a structure of transactions that are to be performed; it's prepared by the incoming reception procedure 506 while parsing the data to be put in an SCTP container.

Work Instruction has a status; it can be NEW and READY

Work Instruction can be linked in a List.

The list of Work Instructions may be referred to as a Work Instruction List.

There is a set of independent procedures in the reception data path. These procedures will be described with reference to FIG. 10-13.

Figure 10:
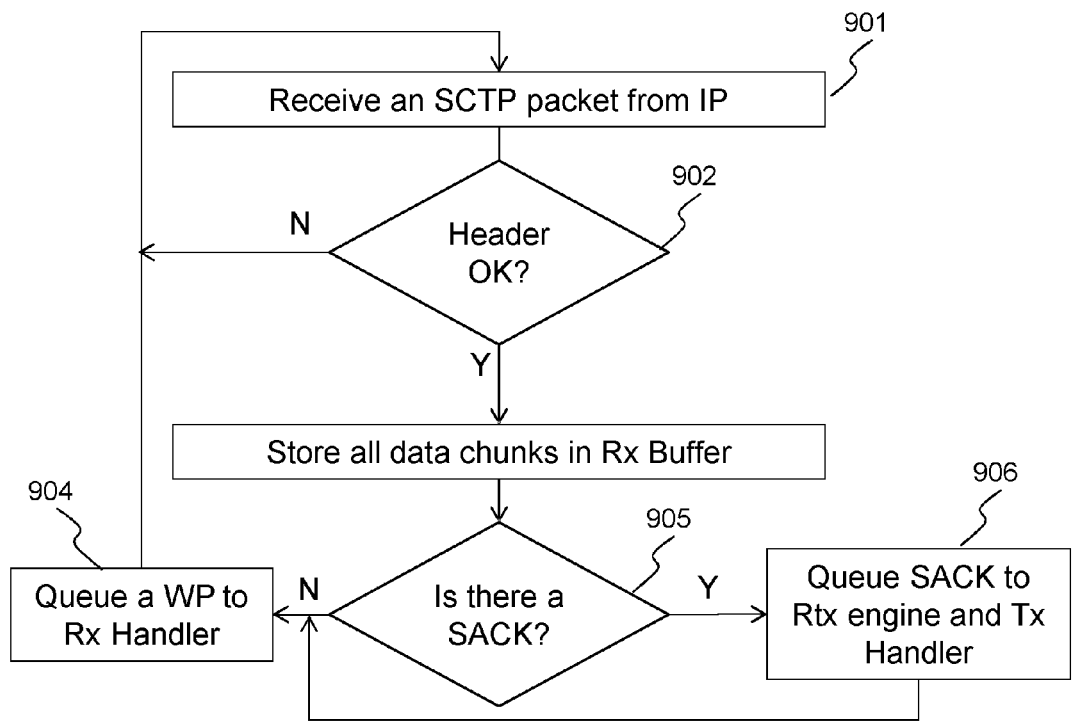
FIG. 10 is a flowchart illustrating actions performed by an exemplifying incoming reception procedure.

FIG. 10 is a flowchart illustrating actions performed by the incoming reception procedure 506, aka Rx SCTP.

The incoming reception procedure 506 is a multi-instance procedure, whose responsibility is to receive 901 the SCTP Packets from the Transport Layer, e.g. the IP layer, to verify that SCTP Header is correct 902, to extract 903 Data Chunks and move them into the reception buffer 505, which may be a TSN indexed SCTP container, prepare a Work Instruction and queue it towards the reception transaction procedure 507 904. In FIGS. 9a and 9b above, another data structure has been described. It's also responsible 905 for extracting SACKs from the SCTP packet and 906 queue them in the Remote Sack List, see R-SACK in FIG. 5.

As soon as a new SCTP packet is delivered from the Transport Layer to SCTP, an instance of the incoming reception procedure 506 will take care of it.

If the received SCTP packet contains Data Chunks, the incoming reception procedure 506 reads the TSN of the first Chunk and stores it in the Work Instruction List, meaning that an SCTP packet containing Chunk Number TSN is being worked.

Figure 11:
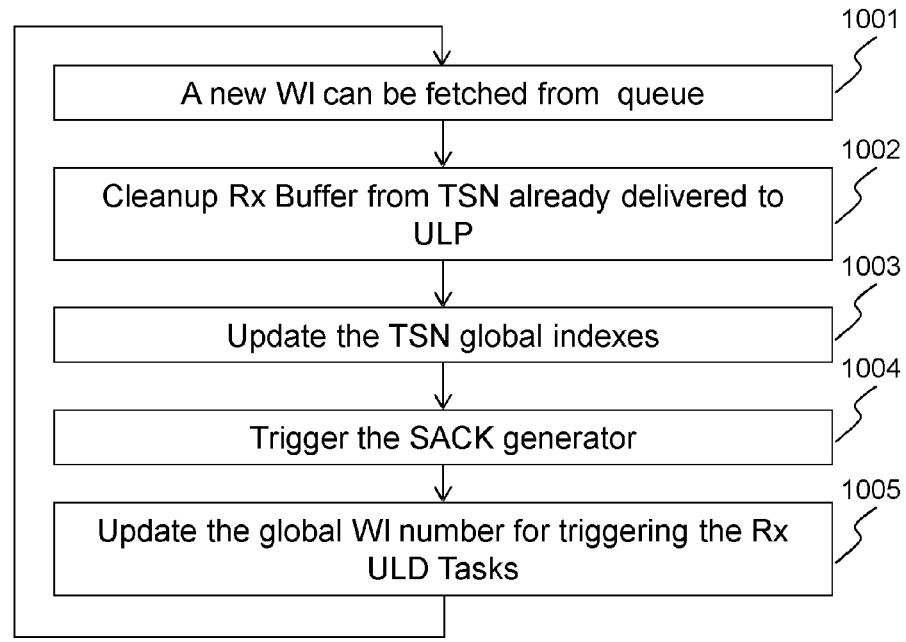
FIG. 11 is a flowchart illustrating actions performed by an exemplifying reception transaction procedure.

Preparation of the Work Instruction follows the following rules:

errors in the SCTP header will cause Discard action, and reception and addition of Chunks to Receiver Buffer will cause Commit with higher received TSN FIG. 11 is a flowchart illustrating actions performed by the reception transaction procedure 507. The reception transaction procedure 507 is a single instance task, whose responsibility is to update the protocol status.

Variables of interest for the reception transaction procedure 507 are TSN and the gapmode, which is explained below.

The reception transaction procedure 507 is triggered 1001 by the reception of a Work Instruction in the Work Instruction List, with status READY.

When reception transaction procedure 507 is triggered, meaning that an SCTP packet has been received, and all related Data Chunks are stored in the reception buffer 505, it updates 1002 the current TSN value according to what contained in the Work Instruction, then 1003 if WI indicates a GAP, it toggles the gapmode=GAP, otherwise it toggles gapmode=NORMAL. If gapmode=GAP then SACK generator is triggered, otherwise SACK generator will be triggered every second received WI, i.e. every second SCTP packet 1004.

Figure 12:
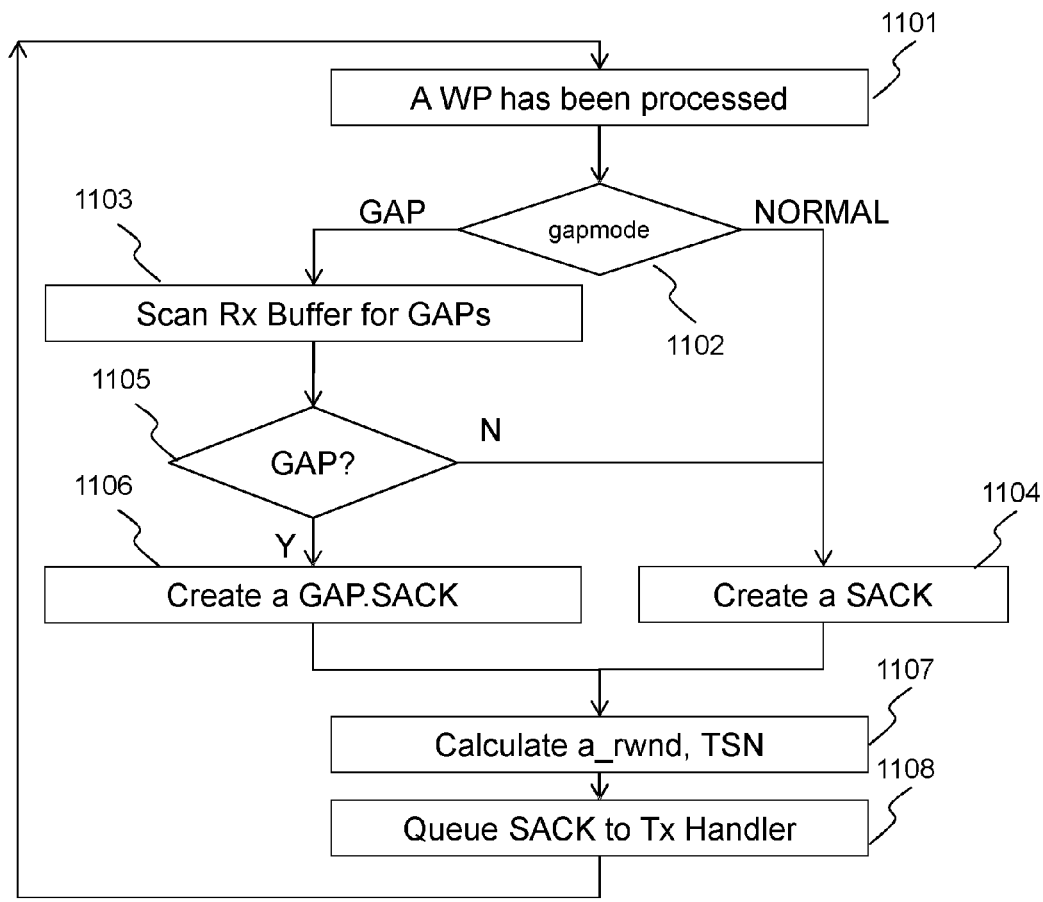
FIG. 12 is a flowchart illustrating actions performed by an exemplifying SACK generating procedure.

FIG. 12 is a flowchart illustrating actions performed by the SACK generating procedure 508.

The SACK generating procedure 508 is a single instance procedure that is responsible for generating SACK towards the remote peer, e.g. the second network node 120.

Variable of interest are the global TSN, the gap mode and the reception buffer 505.

The SACK generating procedure 508 is triggered 1101 by the reception transaction procedure 507.

When triggered, the SACK generating procedure 508 will behave depending on gapmode 1102.

If gapmode=NORMAL, then a normal SACK is to be generated 1104, in that case TSN is copied from global TSN, and the reception buffer 505 is scanned for calculating a_rwnd 1107. The SACK information is then 1108 queued towards the Tx side at the Local SACK List.

If gapmode=GAP, then the reception buffer 505 is scanned for identifying the gaps 1103, then it is verified 1105 that missing chunks are not already received but still unknown to the reception transaction procedure 507. If there are no missing chunks, then SACK generator behaves as in the case where gapmode=NORMAL, otherwise collected gaps are reported in the SACK information 1106, together with a_rwnd and TSN 1107, and the SACK information is queued towards the Tx side at the Local SACK List 1108.

Figure 13:
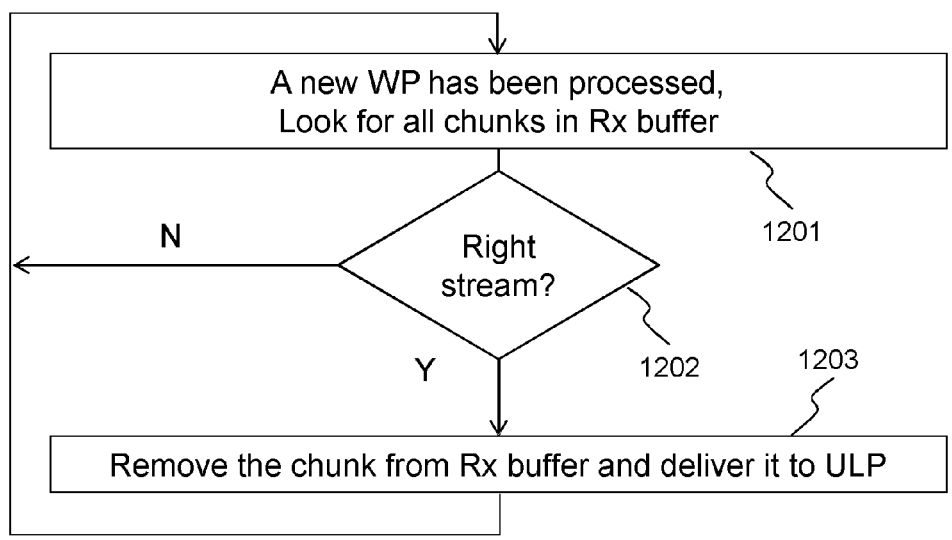
FIG. 13 is a flowchart illustrating actions performed by an exemplifying outgoing reception procedure.

FIG. 13 is a flowchart illustrating actions performed by the outgoing reception procedure 509, aka Rx ULP. The outgoing reception procedure 509 is a multi-instance procedure that is responsible for delivering User Layer Packets (ULP) to the SCTP User.

The outgoing reception procedure 509 is instantiated according to streams towards the SCTP user, and waits for changes in the global TSN.

Variable for interest is the internal Last Delivered TSN.

When the outgoing reception procedure 509 detects a change in global TSN, it starts scanning 1201 the reception buffer 505 starting from Last Delivered TSN down to global TSN, and every time if finds a chunk related to its own stream 1202, such chunk is removed from the reception buffer 505 and the related memory is made free 1203. The chunk is then used for generating ULP data and delivered to SCTP User. At the end of the scanning, Last Delivered TSN is made equal to global TSN.

Figure 14:
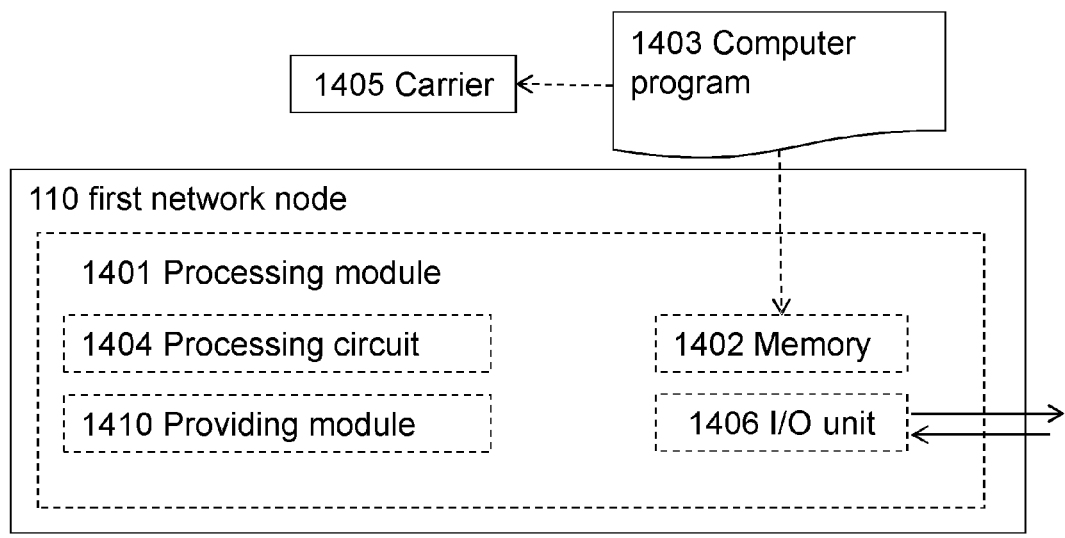
FIG. 14 is a block diagram illustrating embodiments of the first network node.

With reference to FIG. 14, a schematic block diagram of embodiments of the first network node 110 of FIG. 1 is shown. The first network node 110 is thus configured to manage a Stream Control Transmission Protocol, "SCTP", association between the first network node 110 and a second network node 120

As mentioned, the first network node 110 is configured to handle a plurality of computational resources for executing procedures of SCTP at least partially simultaneously. The SCTP association is provided by a SCTP layer 132 between an upper layer 131 on top of the SCTP layer 132 and a lower layer 133 below the SCTP layer 132.

The first network node 110 may comprise a processing module 1401, such as a means, one or more hardware modules and/or one or more software modules for performing the methods described herein.

The first network node 110 may further comprise a memory 1402. The memory may comprise, such as contain or store, a computer program 1403.

According to some embodiments herein, the processing module 1401 comprises, e.g. 'is embodied in the form of' or 'realized by', a processing circuit 1404 as an exemplifying hardware module. In these embodiments, the memory 1402 may comprise the computer program 1403, comprising computer readable code units executable by the processing circuit 1404, whereby the first network node 110 is operative to perform the methods of e.g. FIGS. 2a and 2b.

In some other embodiments, the computer readable code units may cause the first network node 110 to perform the method according to e.g. FIGS. 2a and 2b when the computer readable code units are executed by the first network node 110.

FIG. 14 further illustrates a carrier 1405, or program carrier, which comprises the computer program 1403 as described directly above.

In some embodiments, the processing module 1401 comprises an Input/Output unit 1406, which may be exemplified by a receiving module and/or a sending module as described below when applicable.

In further embodiments, the processing module 1401 may comprise one or more of a providing module 1410 as an exemplifying hardware module. In other examples, the aforementioned exemplifying hardware module may be implemented as one or more software modules.

Therefore, according to the various embodiments described above, the first network node 110, the processing module 1401 and/or the providing module 1410 is operative to, such as configured to, provide a single instance procedure for managing the SCTP association and multi-instance procedures for managing the SCTP association, wherein the single instance procedure is executable, as a single instance of the single instance procedure, by only one computational resource at any given time, and wherein each multi-instance procedure of the multi-instance procedures is executable as one or more instances of said each multi-instance procedure, by one or more computational resources at any given time.

The first network node 110, the processing module 1401 and/or the providing module 1410 is also operative to, such as configured to, provide a control procedure 301 for managing flow and acknowledgement of SCTP packets at the SCTP association, wherein the control procedure 301 manages a retransmission buffer including at least one SCTP container, generated based on ULP frames of the upper layer 131 and/or received SCTP packets, wherein the control procedure 301 manages a reception buffer including the received SCTP packets, and wherein the control procedure 301 is the single instance procedure.

Furthermore, the first network node 110, the processing module 1401 and/or the providing module 1410 is operative to, such as configured to, provide an outgoing transmission procedure 303 for managing and transmitting the SCTP packets from the retransmission buffer, when sending SCTP packets to the lower layer 133. The outgoing transmission procedure 303 is one of the multi-instance procedures.

Moreover, the first network node 110, the processing module 1401 and/or the providing module 1410 is operative to, such as configured to, provide an incoming reception procedure 304 for receiving and managing the SCTP packets, when receiving SCTP packets from the lower layer 133. The incoming reception procedure 304 puts SCTP containers, generated from the received SCTP packets, in a reception buffer, wherein the incoming reception procedure 304 is one of the multi-instance procedures.

Additionally, the first network node 110, the processing module 1401 and/or the providing module 1410 is operative to, such as configured to, provide an outgoing reception procedure 305 for managing and transmitting ULP frames to the upper layer, when emptying the reception buffer. The outgoing reception procedure 305 is one of the multi-instance procedures.

A set of single instance procedures may include the single instance procedure.

The first network node 110 may be configured to provide an incoming transmission procedure 501 for managing the retransmission buffer, wherein the incoming transmission procedure 501 may be one of the single instance procedures of the set of single instance procedure.

The incoming transmission procedure 501 may be executable in one of the computational resources at least partly simultaneously with at least one of the multi-instance procedures and the other single instance procedures.

The first network node 110 may be configured to provide a transmission transaction procedure 502 for delivering SCTP packets, via the retransmission buffer, towards the outgoing transmission procedure, wherein the transmission transaction procedure 502 may be one of the single instance procedures of the set of single instance procedure.

The transmission transaction procedure 502 may be executable in one of the computational resources at least partly simultaneously with at least one of the multi-instance procedures and the other single instance procedures.

Furthermore, the first network node 110 may be configured to provide a retransmission procedure 503 for handling unacknowledged chunks of the transmitted SCTP packets, wherein the retransmission procedure 503 may be one of the single instance procedures of the set of single instance procedure.

The retransmission procedure 503 may be executable in one of the computational resources at least partly simultaneously with at least one of the multi-instance procedures and the other single instance procedures.

Moreover, the first network node 110 may be configured to provide a reception transaction procedure 507 for checking received SCTP packets, wherein the reception transaction procedure 507 may be one of the single instance procedures of the set of single instance procedure.

The reception transaction procedure 507 may be executable in one of the computational resources at least partly simultaneously with at least one of the multi-instance procedures and the other single instance procedures.

The first network node 110 may also be configured to provide a SACK generating procedure 508 for generating SACKs towards the second network node 120, wherein the SACK generating procedure 508 may be one of the single instance procedures of the set of single instance procedure.

The SACK generating procedure 508 may be executable in one of the computational resources at least partly simultaneously with at least one of the multi-instance procedures and the other single instance procedures.

As used herein, the term "node" may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner.

As used herein, the term "program carrier" may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc.

As used herein, the term "computer readable code units" may be text of a computer program, parts of or an entire binary file representing a computer program in a compiled format or anything there between.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of", such as set of devices, may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a first network node, for managing a Stream Control Transmission Protocol, "SCTP", association between the first network node and a second network node, wherein the first network node handles a plurality of computational resources for executing procedures of SCTP at least partially simultaneously, wherein the SCTP association is provided by a SCTP layer between an upper layer on top of the SCTP layer and a lower layer below the SCTP layer, wherein the method comprises:
    providing a single instance procedure for managing the SCTP association and multi-instance procedures for managing the SCTP association, wherein the single instance procedure is executable, as a single instance of the single instance procedure, by only one computational resource at any given time, and wherein each multi-instance procedure of the multi-instance procedures is executable as one or more instances of said each multi-instance procedure, by one or more computational resources at any given time,
    providing a control procedure for managing flow and acknowledgement of SCTP packets at the SCTP association, wherein the control procedure manages a retransmission buffer including at least one SCTP container, generated based on ULP frames of the upper layer and/or received SCTP packets, wherein the control procedure manages a reception buffer including the received SCTP packets, and wherein the control procedure is the single instance procedure,
    when sending SCTP packets to the lower layer, providing an outgoing transmission procedure for managing and transmitting the SCTP packets from the retransmission buffer, wherein the outgoing transmission procedure is one of the multi-instance procedures,
    when receiving SCTP packets from the lower layer, providing an incoming reception procedure for receiving and managing the SCTP packets, wherein the incoming reception procedure puts SCTP containers, generated from the received SCTP packets, in a reception buffer, wherein the incoming reception procedure is one of the multi-instance procedures, and
    when emptying the reception buffer, providing an outgoing reception procedure for managing and transmitting ULP frames to the upper layer, wherein the outgoing reception procedure is one of the multi-instance procedures.

2. The method according to claim 1, wherein a set of single instance procedures includes the single instance procedure, wherein the providing of the control procedure comprises:
    providing an incoming transmission procedure for managing the retransmission buffer, wherein the incoming transmission procedure is one of the single instance procedures of the set of single instance procedure;
    providing a transmission transaction procedure for delivering SCTP packets, via the retransmission buffer, towards the outgoing transmission procedure, wherein the transmission transaction procedure is one of the single instance procedures of the set of single instance procedure;
    providing a retransmission procedure for handling unacknowledged chunks of the transmitted SCTP packets, wherein the retransmission procedure is one of the single instance procedures of the set of single instance procedure;
    providing a reception transaction procedure for checking received SCTP packets, wherein the reception transaction procedure is one of the single instance procedures of the set of single instance procedure; and providing a SACK generating procedure for generating SACKs towards the second network node, wherein the SACK generating procedure is one of the single instance procedures of the set of single instance procedure.

3. The method according to claim 2, wherein the incoming transmission procedure is executable in one of the computational resources at least partly simultaneously with at least one of the multi-instance procedures and the other single instance procedures,
wherein the transmission transaction procedure is executable in one of the computational resources at least partly simultaneously with at least one of the multi-instance procedures and the other single instance procedures,
wherein the retransmission procedure is executable in one of the computational resources at least partly simultaneously with at least one of the multi-instance procedures and the other single instance procedures,
wherein the reception transaction procedure is executable in one of the computational resources at least partly simultaneously with at least one of the multi-instance procedures and the other single instance procedures, and/or
wherein the SACK generating procedure is executable in one of the computational resources at least partly simultaneously with at least one of the multi-instance procedures and the other single instance procedures.

4. A first network node configured to manage a Stream Control Transmission Protocol, "SCTP", association between the first network node and a second network node, wherein the first network node is configured to handle a plurality of computational resources for executing procedures of SCTP at least partially simultaneously, wherein the SCTP association is provided by a SCTP layer between an upper layer on top of the SCTP layer and a lower layer below the SCTP layer, wherein the first network node configured to:
provide a single instance procedure for managing the SCTP association and multi-instance procedures for managing the SCTP association, wherein the single instance procedure is executable, as a single instance of the single instance procedure, by only one computational resource at any given time, and wherein each multi-instance procedure of the multi-instance procedures is executable as one or more instances of said each multi-instance procedure, by one or more computational resources at any given time,
provide a control procedure for managing flow and acknowledgement of SCTP packets at the SCTP association, wherein the control procedure manages a retransmission buffer including at least one SCTP container, generated based on ULP frames of the upper layer and/or received SCTP packets, wherein the control procedure manages a reception buffer including the received SCTP packets, and wherein the control procedure is the single instance procedure,
when sending SCTP packets to the lower layer, provide an outgoing transmission procedure for managing and transmitting the SCTP packets from the retransmission buffer, wherein the outgoing transmission procedure is one of the multi-instance procedures,
when receiving SCTP packets from the lower layer, provide an incoming reception procedure for receiving and managing the SCTP packets, wherein the incoming reception procedure puts SCTP containers, generated from the received SCTP packets, in a reception buffer, wherein the incoming reception procedure is one of the multi-instance procedures, and
when emptying the reception buffer, provide an outgoing reception procedure for managing and transmitting ULP frames to the upper layer, wherein the outgoing reception procedure is one of the multi-instance procedures.

5. The first network node according to claim 4, wherein a set of single instance procedures includes the single instance procedure, wherein the first network node configured to:
provide an incoming transmission procedure for managing the retransmission buffer, wherein the incoming transmission procedure is one of the single instance procedures of the set of single instance procedure;
provide a transmission transaction procedure for delivering SCTP packets, via the retransmission buffer, towards the outgoing transmission procedure, wherein the transmission transaction procedure is one of the single instance procedures of the set of single instance procedure;
provide a retransmission procedure for handling unacknowledged chunks of the transmitted SCTP packets, wherein the retransmission procedure is one of the single instance procedures of the set of single instance procedure;
provide a reception transaction procedure for checking received SCTP packets, wherein the reception transaction procedure is one of the single instance procedures of the set of single instance procedure; and
provide a SACK generating procedure for generating SACKs towards the second network node, wherein the SACK generating procedure is one of the single instance procedures of the set of single instance procedure.

6. The first network node according to claim 5, wherein the incoming transmission procedure is executable in one of the computational resources at least partly simultaneously with at least one of the multi-instance procedures and the other single instance procedures,
wherein the transmission transaction procedure is executable in one of the computational resources at least partly simultaneously with at least one of the multi-instance procedures and the other single instance procedures,
wherein the retransmission procedure is executable in one of the computational resources at least partly simultaneously with at least one of the multi-instance procedures and the other single instance procedures,
wherein the reception transaction procedure is executable in one of the computational resources at least partly simultaneously with at least one of the multi-instance procedures and the other single instance procedures, and/or
wherein the SACK generating procedure is executable in one of the computational resources at least partly simultaneously with at least one of the multi-instance procedures and the other single instance procedures.

* * * * *